July 20, 1937. O. B. MUELLER ET AL 2,087,526

VALVE

Filed May 20, 1936

Oscar B. Mueller,
John E. Gray,
Inventors,
Delos G. Haynes,
Attorney.

Patented July 20, 1937

2,087,526

UNITED STATES PATENT OFFICE 2,087,526

VALVE

Oscar B. Mueller and John E. Gray, Port Huron, Mich., assignors to Mueller Brass Co., Port Huron, Mich., a corporation of Michigan Application May 20, 1936, Serial No. 80,765

4 Claims. (Cl. 277—29)

This invention relates to valves, and with regard to certain more specific features, to combination manually operable and automatic pressure relief valves.

Among the several objects of the invention may be noted the provision of a valve of the class described which is unusually simple but nevertheless effective in construction and operation; a valve of the class described which is capable of adaptation to any one of a number of different fluids; the provision of a valve of the class described which is made up of a minimum number of parts; and the provision of a valve of the class described which is economical to manufacture, from the standpoint of machining operations and the like. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a longitudinal section of a valve embodying the present invention;

Similar reference characters indicate corresponding parts throughout the several views of the drawing.

Figure 1:
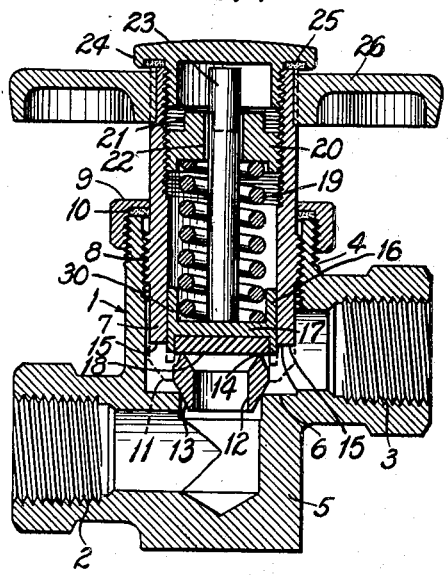
Figure 2:
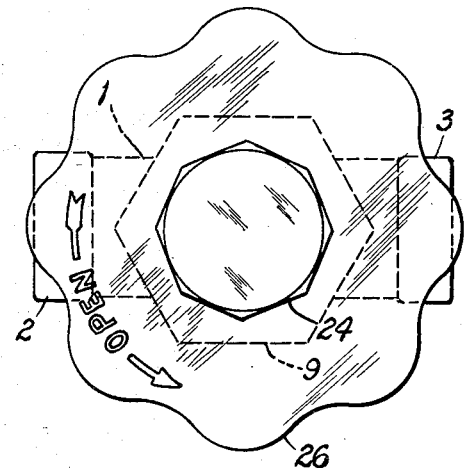
Fig. 2 is a top plan view of the valve of Fig. 1.

Referring now more particularly to Fig. 1, numeral 1 indicates a generally cup-shaped valve body which is provided with a lateral inlet and an opposite outlet 3. The inlet 2 is located at a lower position on the body 1 than the outlet 3, so that their respective passages do not intersect. The valve body 1 comprises an upper cylindrical portion 4, threaded at its end both interiorly and exteriorly, and a lower cylindrical portion 5. The lower end of the portion 5 is closed. The central opening of the portion 5 is of lesser diameter than the central opening of the portion 4, providing an annular shoulder 6 which constitutes a valve seat.

The inlet 2 communicates with the lower portion 5 of the valve body, while the outlet 3 communicates with the upper portion 4. Fluid may flow from the inlet 2 to the outlet 3 only by passing through the valve seat 6, or through a port 15 to be described.

Numeral 7 indicates a tubular elements which is of slightly less diameter than the inner diameter of the valve body portion 4, so as to slip freely therein. Near its upper end, the tubular portion 7 is exteriorly threaded as indicated at numeral 8, the threads 8 engaging the interior threads of the portion 4 of the valve body. A packing nut 9 engages the exterior threads on the upper end of the portion 4 of the body in order to press packing material 10 into position to seal the body 1 and the tubular element 7 together.

The packing nut 9 also functions as a stop, preventing turning the tubular portion 7 all of the way out.

Figure 3:
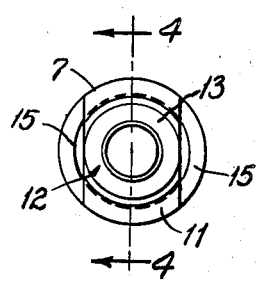
Fig. 3 is a side elevation of a fragment of a tubular member.
Figure 4:
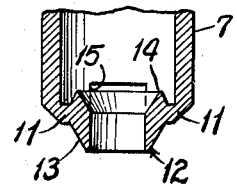
Fig. 4 is a vertical section taken substantially along line 4—4 of Fig. 3.

The lower end of the tubular element 7 is of a particular construction, which will be seen more particularly from Figures 1, 3, and 4. First, the end of the tubular body 7 is formed with an inwardly extending flange or web 11, which supports a nozzle element 12. The nozzle element 12 extends both above and below the web 11. A portion 13 extending below the flange 11 is tapered on its outer surface to seat upon the valve seat 6. The upper end 14 of the nozzle 12 is tapered on both sides to a circular bead or rounded annular edge.

Numerals 15 indicate cut-away portions that are provided on each side of the lower end of the valve 7, in order to provide for communication between the interior of the tube 7 and the interior of the valve body. The cut-away portions 15 do not, however, remove material from the nozzle element 12.

As shown, the nozzle element 12, web 11, and tube 7 are formed as an integral, one piece element, but it will readily be understood that this is an optional feature of manufacture.

Numeral 30 indicates a seating assembly that slides relatively tightly, in the manner of a piston, inside the tubular element 7. The seating assembly comprises a cylinder 16 with a web 17 extending thereacross, the web 17 making the cylinder 16 serve as both upwardly and downwardly extending cylindrical flanges. In the region provided by the downward extension of the cylinder 16 and the web 17 is cast or otherwise fitted a plug or insert 18, which may, for example, be of a relatively soft metallic alloy such as an alloy of lead, tin, antimony, and copper, the proportions of which are such as to form an alloy that will be soft enough to permit the edge 14 to imbed itself in the alloy yet hard enough so that it will not continue to flow away from the edge

14, even though considerable compression is applied between the two elements. The upwardly extending flange of cylinder 16 provides a retaining cup for the lower end of a compression spring 19, the upper end of which reacts against a nut or adjusting screw 20 that is threaded down in suitable threads on the inside face of the tubular element 7. The nut 20 has a slotted head portion 21, so that it can readily be manipulated. The nut 20 also has a central opening 22 therethrough. Through the central opening 22 passes a rod 23. The function of the rod 23 is to permit tapping or like blows to be applied to the seat assembly 30 in order firmly to imbed the edge 14 in the soft metal 18. The rod 23 is not sufficiently long to interfere with the action of the valve, and yet it should be long enough to extend well above the nut 20 in order to bring it into a more readily manipulable position.

The sealing cap 24 is likewise threaded into inner top of the tubular element 7, clamping a gasket 25 between the under surface of its head and the end of the tubular element 7, thereby to seal off the tubular element 7 against the entry of outside air, or vice versa.

The exterior face of the upper end of the tubular element 7 is preferably made polygonal, in order to receive a hand wheel or the like indicated by numeral 26.

The operation of the valve as thus described is as follows:

Under normal conditions, the spring 19, reacting between the nut 20 and the seating assembly 30, holds the soft metal alloy insert 18 in an imbedded relation with respect to the upwardly extending end portion 14. Thus, the soft metal insert 18 comprises a gasket sealing this means of egress for fluid coming in at the inlet 2. At the same time, if the entire tubular body 7 is screwed downwardly, as by manipulating the hand wheel 26, the sloping face 13 is brought to bear and seat on the valve seat 16. Thus no fluid can pass from the inlet region of the valve to the outlet region.

For manual operation, all that needs to be done is to turn the hand wheel 26 in the proper direction, thereby separating the conical edge 13 and the valve seat 6 and permitting fluid to flow from the inlet to the outlet. On the other hand, even if the manual valve is seated, if the pressure becomes excessively high (e. g. sufficiently high to compress the spring 19), then the soft metal insert 18 is forced to unseat from its seat 14 and fluid can flow through the nozzle 12, past the soft metal insert 18 and out through the notches 15 to the outlet 3.

The pressure at which the pressure relief valve operates will be determined largely by the tension placed in the spring 19 by the nut 20.

In many cases it is not necessary to use a relatively expensive metallic alloy for the insert 18. For example, when sulfur dioxide and the like are used in a refrigerating circuit (to which the present invention particularly relates), a rubber or synthetic rubber or rubber-like composition such as "Duprene" can be used. In the latter instance, the use of the rod 23 is unnecessary, and it may be omitted from the assembly, since the resilient pressure of the spring 19 alone is ordinarily sufficient to establish a good seating relation between the "Duprene" insert 18 and the valve seat 14.

After one or two openings of the valve with the alloy insert 18, the shape of the alloy insert appears to change somewhat, making it necessary to drive a new seat into the insert 18 by tapping lightly with blows applied on the external end of the rod 23.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interrupted as illustrative and not in a limiting sense.

We claim:

1. In a valve, a valve body, inlet and outlet means for said body, a valve seat between said inlet and said outlet means, manually operable valve closure means adapted to seat on said valve seat, said closure means being hollow, and being provided with a second valve seat therein, a closure for said second valve seat within said first valve closure means, and means tending to maintain said second closure means seated on said second seat, said first closure means having a passage connecting its interior to the valve outlet, whereby when said second valve closure is unseated from its seat, communication is afforded from said inlet to said outlet, said second valve closure element having a relatively soft consistency, whereby it tends to imbed itself on its seat, and a seating rod resting on said second valve closure element and available for manipulation at the upper end of the hollow closure of the first valve.

2. In a valve, a valve body, inlet and outlet means for said body, a valve seat between said inlet and said outlet means, manually operable valve closure means adapted to seat on said valve seat, said closure means being hollow, and being provided with a second valve seat therein, a closure for said second valve seat within said first valve closure means, said last-named closure having a relatively soft consistency, whereby it tends to imbed itself on its seat, and means tending to maintain said second closure means seated on said second seat, said last-named means being provided with a passage extending to the open end of said hollow closure means, which passage is adapted to receive an element from the exterior of the valve and permit said element to be applied to said second valve closure element in order more securely to imbed it on its seat, said first closure means having a passage connecting its interior to the valve outlet, whereby when said second valve closure is unseated from its seat, communication is afforded from said inlet to said outlet.

3. A valve comprising a valve body provided with inlet and outlet means and a valve seat between said inlet and outlet means, tubular means threaded in said valve body, said tubular means being manually operable, said tubular means being provided at its lower end with a nozzle, the lower end of said nozzle constituting a valve closure element adapted to seat against said valve seat, and the upper end of said nozzle constituting a second valve seat, a second valve closure element slidable in said tubular member and adapted to seat against the second-named valve seat, a nut threaded into the upper end of said tubular member, and a compression spring reacting between said nut and said second valve closure, said tubular element being provided with a passage connecting its interior to the main valve outlet above said second-named valve seat, said second-named valve closure element having a relatively soft material insert adapted to imbed said second valve seat therein, and a seating rod resting on said second valve closure element and available for manipulation at the upper end of said tubular element.

4. A valve comprising a valve body provided with inlet and outlet means and a valve seat between said inlet and outlet means, tubular means threaded in said valve body, said tubular means being manually operable, said tubular means being provided at its lower end with a nozzle, the lower end of said nozzle constituting a valve closure element adapted to seat against said valve seat, and the upper end of said nozzle constituting a second valve seat, a second valve closure element slidable in said tubular member and adapted to seat against the second-named valve seat, a nut threaded into the upper end of said tubular member, and a compression spring reacting between said nut and said second valve closure, said tubular element being provided with a passage connecting its interior to the main valve outlet above said second-named valve seat, said second-named valve closure element having a relatively soft metal alloy insert adapted to imbed said second valve seat therein, and a seating rod resting on said second valve closure element and available for manipulation at the upper end of said tubular element.

OSCAR B. MUELLER.
JOHN E. GRAY.